(12) United States Patent
Doering

(10) Patent No.: US 11,137,995 B2
(45) Date of Patent: Oct. 5, 2021

(54) UPDATING FIRMWARE OF A MICROCONTROLLER

(71) Applicant: INTERNATIONAL BUSINESS MACHINES CORPORATION, Armonk, NY (US)

(72) Inventor: Andreas Christian Doering, Zufikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 16/274,305

(22) Filed: Feb. 13, 2019

(65) Prior Publication Data
US 2020/0257520 A1 Aug. 13, 2020

(51) Int. Cl.
*G06F 8/654* (2018.01)
*G06F 13/42* (2006.01)
*G06F 9/4401* (2018.01)

(52) U.S. Cl.
CPC ............ *G06F 8/654* (2018.02); *G06F 9/4411* (2013.01); *G06F 13/4282* (2013.01)

(58) Field of Classification Search
CPC ..... G06F 8/654; G06F 9/4411; G06F 13/4282
USPC ....................................................... 717/168
See application file for complete search history.

(56) References Cited

U.S. PATENT DOCUMENTS

| | | | | |
|---|---|---|---|---|
| 2003/0005203 A1* | 1/2003 | Nalawadi | .............. | G06F 13/387 710/305 |
| 2006/0112191 A1* | 5/2006 | Ooi | ....................... | H04J 3/0658 709/248 |
| 2006/0135138 A1* | 6/2006 | Lazaridis | ................. | H04M 3/54 455/417 |
| 2010/0058043 A1* | 3/2010 | Hayutin | ..................... | G06F 8/60 713/2 |
| 2010/0205657 A1* | 8/2010 | Manring | ............... | G06F 21/566 726/5 |

(Continued)

FOREIGN PATENT DOCUMENTS

| | | |
|---|---|---|
| CN | 101261585 A | 9/2008 |
| CN | 101963910 A | 2/2011 |
| TW | I356343 B | 1/2012 |

OTHER PUBLICATIONS

Anonymous, "AN73503—PSoC® USB HID Bootloader," Feb. 4, 2019, pp. 1-4, retrieved from the Internet https://www.cypress.com/documentation/application-notes/an73503-psoc-usb-hid-bootloader.

(Continued)

*Primary Examiner* — Chat C Do
*Assistant Examiner* — Bradford F Wheaton
(74) *Attorney, Agent, or Firm* — Cantor Colburn LLP; Daniel Morris

(57) ABSTRACT

Embodiments of the invention provide a computer-implemented method for updating firmware of a Universal Serial Bus (USB) device. The USB device is configured to execute one or more applications of the USB device in a normal mode of operation of the USB device. The USB device includes a device descriptor indicative of one or more configuration descriptors, wherein a configuration descriptor is indicative of endpoints for data and command exchange. The device descriptor can be modified by adding a predefined bootloader configuration descriptor to the configurations descriptors for updating the firmware.

15 Claims, 2 Drawing Sheets

(56) References Cited

U.S. PATENT DOCUMENTS

| | | | | |
|---|---|---|---|---|
| 2012/0303846 A1* | 11/2012 | Li | ............................ | G06F 3/162 |
| | | | | 710/63 |
| 2013/0218551 A1* | 8/2013 | Sakthikumar | ......... | G06F 21/572 |
| | | | | 703/24 |
| 2014/0325496 A1 | 10/2014 | Son | | |
| 2016/0098582 A1* | 4/2016 | Lu | ......................... | G06F 13/382 |
| | | | | 235/441 |
| 2016/0306616 A1 | 10/2016 | Tomppo | | |
| 2019/0245901 A1* | 8/2019 | Mamidwar | ......... | H04L 65/4092 |

OTHER PUBLICATIONS

Anonymous, "Device firmware update (DFU) over BLE and USB," Feb. 26, 2018, pp. 1; retrieved from the Internet https://devzone.nordicsemi.com/f/nordic-q-a/575/device-firmware-update-dfu-over-ble-and-usb.

Anonymous, "Maple Bootloader(s)," Feb. 4, 2019, pp. 1-5, retrieved from the Internet http://docs.leaflabs.com/static.leaflabs.com/pub/leaflabs/maple-docs/0.0.12/bootloader.html.

Anonymous, "Update firmware over usb/serial, without dfu-util," Feb. 26, 2018, pp. 1-2; retrieved from the Internet https://community.particle.io/t/update-firmware-over-usb-serial-without-dfu-util/9289/print.

\* cited by examiner

UPDATING FIRMWARE OF A MICROCONTROLLER

BACKGROUND

The present invention relates to the field of digital computer systems, and more specifically, to computer systems, computer program products, and computer-implemented methods for updating firmware of a Universal Serial Bus (USB) device.

Microcontrollers with integrated nonvolatile memories play an important role in many consumer, industrial, or medical devices. These devices may have to regularly be updated to meet new requirements or to take changed standards or legal requirements into account or to optimize the operation of the devices. One typical method for software updates is to define a short waiting time (e.g. 5 seconds) after the power is applied to the device. If within that time update commands are received, the software can be updated through an interface, otherwise the device starts the normal operation.

SUMMARY

Various embodiments provide a method for updating a firmware of a USB device, microcontroller and computer program product as described by the subject matter of the independent claims. Advantageous embodiments are described in the dependent claims. Embodiments of the present invention can be freely combined with each other if they are not mutually exclusive.

In one aspect of the invention, a method is provided for updating a firmware of a Universal Serial Bus (USB) device, the USB device being configured to execute one or more applications of the USB device in a normal mode of operation of the USB device, the USB device comprising a device descriptor indicative of one or more configuration descriptors, wherein a configuration descriptor is indicative of endpoints for data and command exchange. The method includes modifying the device descriptor by adding a predefined bootloader configuration descriptor to the configurations descriptors; enabling access to the modified device descriptor to a USB host, thereby causing the USB host to select the bootloader configuration; receiving a request from the USB host indicative of a selection of the bootloader configuration; and, in response to generating an internal interrupt within a processor of the USB device, reading the request for controlling the USB device to operate in accordance with the bootloader configuration, thereby switching into an update mode of operation of the USB device for updating the firmware.

In another aspect of the invention, a computer program product is provided that includes a computer-readable storage medium having computer-readable program code embodied therewith, the computer-readable program code configured to implement all of steps of the method according to embodiments of the invention described herein.

In another aspect of the invention, a microcontroller is provided that includes at least one processor core; a nonvolatile programmable memory storing computerized instructions, said memory further comprising a region that can only be programmed by an external programmer and not by the processor core; a device descriptor indicative of one or more configuration descriptors; and a Universal Serial Bus (USB) interface implemented as a combination of both hardware and software, wherein the software is stored in the non-volatile memory, and wherein the hardware implementing the interface is designed so as to generate an interrupt (e.g. the interrupt may be a non-maskable interrupt) request to the processor core, and wherein the software is configured to receive the interrupt from the processor core and to control the USB device to operate in accordance with a bootloader configuration of the configuration descriptors.

BRIEF DESCRIPTION OF THE DRAWINGS

In the following embodiments of the invention are explained in greater detail, by way of example only, making reference to the drawings in which.

DETAILED DESCRIPTION

Figure 1:
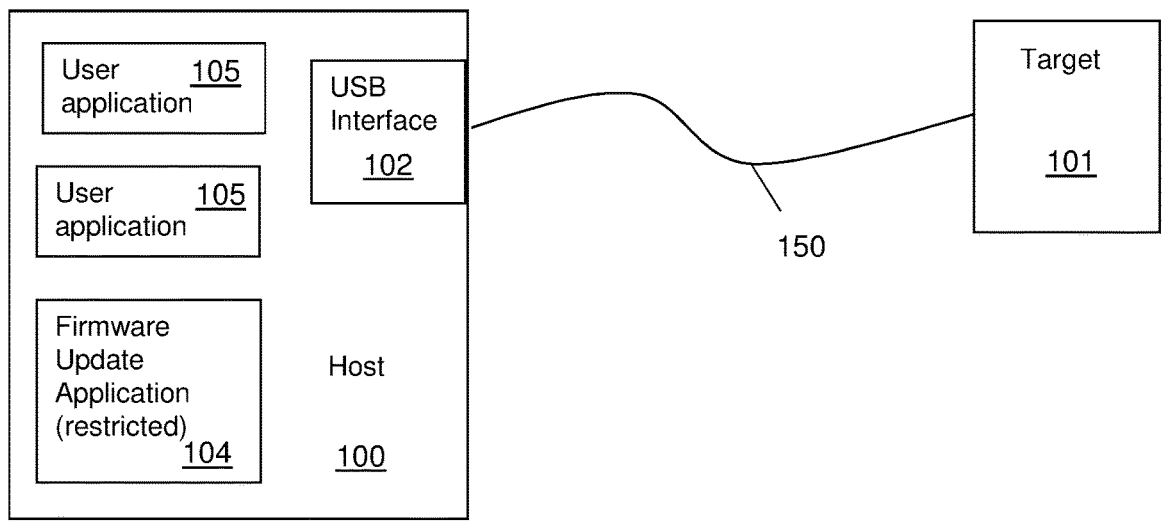
FIG. 1 is a schematic representation of a computing device which is connected to a microcontroller in accordance with aspects of the invention.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may enable a controlled update that can be performed at any time e.g. during the function of the USB device or at the start of the USB device. This may enable a flexible and reliable method for performing updates. In this way it may be guaranteed that the USB device can always be updated e.g. with a bootloader code. The present disclosure may enable the firmware update with a different USB configuration.

The USB device may be a microcontroller. The USB device may be configured to store data in a flash memory with a USB integrated interface. The USB device may comprise a hardware unit (e.g. a USB serial interface) for the low-level aspects of the USB protocol. This hardware unit uses interrupts, registers, shared memory and/or direct memory access to communicate with other parts of the USB device.

The interrupt signal may be a non-maskable interrupt signal. This may prevent to mask the interrupt signal and thus block the update. The interrupt signal may be triggered upon reception of the request, wherein the request comprises a USB control frame. Next, an interrupt code is located. The interrupted code may be stored in a protected memory area of the USB device. The interrupt code checks whether the control frame is valid and whether it is a set_configuration command and if the configuration is the predefined bootloader configuration. If these conditions are met (the checks are successful), a bootloader code may be entered for performing the update of the firmware.

According to one embodiment, the USB device stores an interrupt code and a bootloader code, wherein the reading of the request comprises checking using the interrupt code whether a control frame of the request is valid and determining that the requested configuration is the predefined bootloader configuration, wherein the switching into the update mode comprises entering the bootloader code. This embodiment may seamlessly be integrated in existing systems by modifying existing structures in accordance with the present disclosure.

According to one embodiment, the request is indicative of one or more endpoints, wherein the switching into the update mode comprises blocking access to the one or more endpoints by other applications than the bootloader code while the USB device is in the update mode. This may prevent any malfunction of the USB device due to inconsistent or concurrent accesses to interfaces of the USB device e.g. by multiple application codes.

According to one embodiment, the bootloader code and/or the interrupt code are stored in a memory region of the USB device that can only be programmed by an external programmer and not by the processor. This may enable a secure update of the firmware at the USB device.

According to one embodiment, the request is received via a USB interface of the USB device, wherein the interrupt is generated by the USB interface.

FIG. 1 is a schematic representation of a computing device 100 which is connected to a microcontroller 101 by a USB cable 150. The computing device 100 includes a USB interface 102 configured to connect via the USB cable 150 to the microcontroller 101. For example, the computing device 100 may comprise a firmware update application 104 and user applications 105. The firmware update application 104 may be restricted for predefined users only e.g. the firmware update application 104 may be executed only by system administrators, or "root". The firmware update application 104 may, for example, be configured to download or receive a firmware update e.g. from a server providing firmware updates, and may be configured to initiate a firmware update of the microcontroller 101. The microcontroller 101 may be referred to as a USB target device and the computing device 100 may be referred to as a host or USB host.

Figure 2:
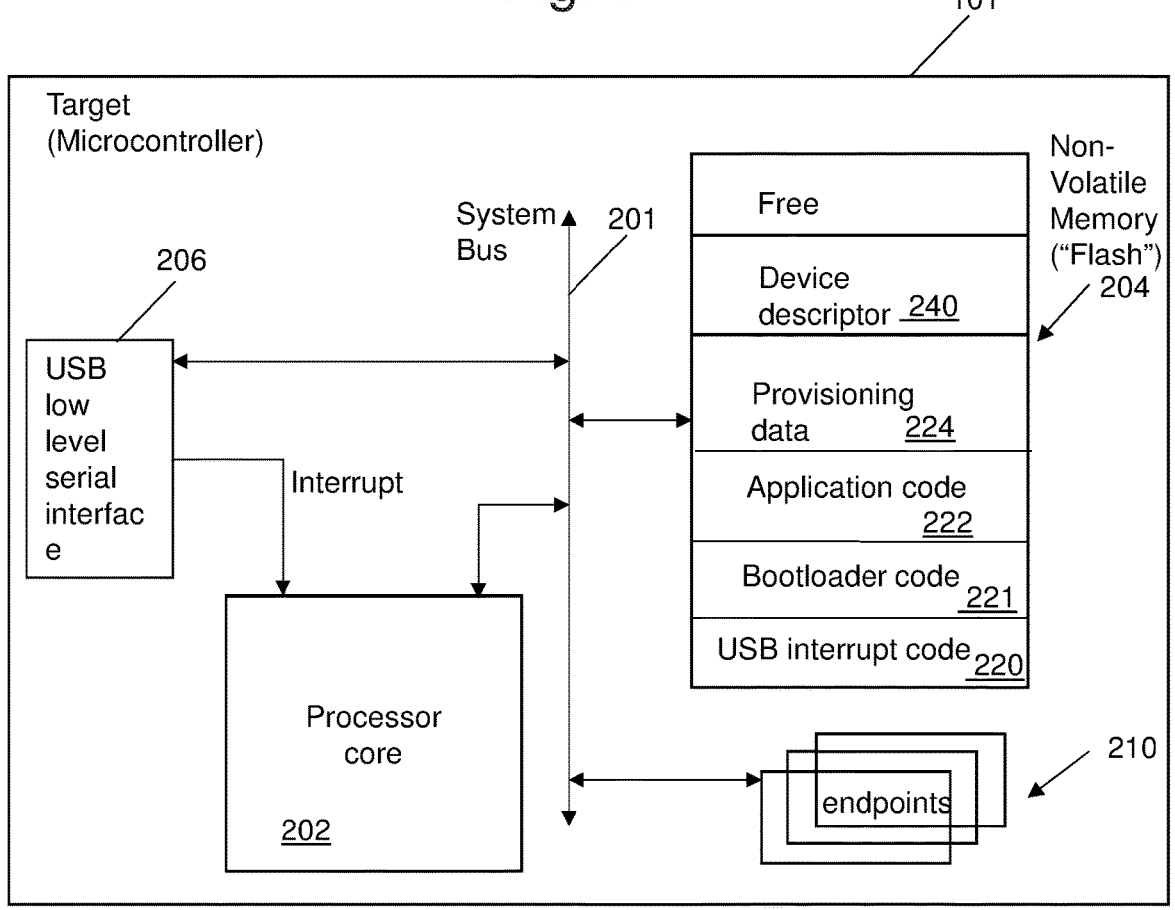
FIG. 2 is a block diagram of a microcontroller in accordance with aspects of the invention.

FIG. 2 is a block diagram of a microcontroller 101 in accordance with the present disclosure. Internal bus 201 connects CPU or processor core 202 with an endpoint register file 210, a USB serial interface 206 and non-volatile memory 204 (e.g. a flash memory). CPU 202 can operate on or modify the data by reading the data over bus 201. A RAM (not shown) can store instructions for execution by the CPU 202 and data operated on by the CPU 202. The microcontroller 101 may be configured to receive transactions over USB serial interface 206. An interrupt to CPU 202 can be generated when a new command is detected on USB serial interface 206. The USB serial interface 206 may connect to a port on a USB host e.g. 100 and serves as an interface to the USB protocol. For example, the USB serial interface 206 formats data to be transmitted to the host 100 in accordance with the USB protocol. It reformats data received from the USB host 100 in accordance with the USB protocol into a form that can be buffered in the microcontroller 101.

The non-volatile memory 204 may be used to store a firmware that supports a functionality of the microelectronic 101. For example, the memory 204 may comprise provisioning data 224 in the form of firmware and/or configuration data that can be executed by the CPU 202, thereby allowing the microcontroller 101 to operate as desired. In addition to provisioning data 224, the memory 204 may comprise a boot loader code or boot loader application 220, a USB interrupt code 221 and an application code 222.

The boot loader code 220 is used by the microcontroller 101 to load new provisioning data in memory 204 (e.g., replace, update, upgrade, or downgrade provisioning data 224 with new provisioning data).

CPU 202 can execute USB interrupt code 221 of the memory 204 to handle predefined interrupts and process new commands. When a predefined trigger event occurs, the CPU 202 executes the interrupt code 221. The interrupt code 221 may for example be associated with a predefined interrupt. The interrupt may be defined by the type of the events that trigger the interrupt. For example, the interrupt may be triggered by an event at the host 100. For example, the reception of new updates at the firmware update application 104 may be an event that triggers the interrupt via a corresponding request from the host 100. This kind of interrupts may be associated at the microcontroller 101 to the interrupt code 221. Thus, when the predefined trigger event occurs at the host 100, a request is sent to notify the microcontroller 101 accordingly. The request may be received at a specific pin. For example, the request may be received at the USB serial interface 206. Upon receiving the request, the USB serial interface 206 sends an interrupt signal to the CPU 202. When the CPU receives the interrupt signal, it suspends a current program execution and then loads and runs the interrupt code 221 corresponding to the interrupt signal. The CPU 202 may be configured to ignore, or mask particular interrupts, to block out unwanted those particular interrupts. The interrupt signal that is triggered by an update event for updating the firmware may not be masked e.g. by the CPU. For that, the generated interrupt signal may be a non-maskable interrupt signal.

The memory 204 further comprises a device descriptor 240 indicative of one or more configuration descriptors. A configuration descriptor is indicative of endpoints, of the endpoint register file 210, for data and command exchange. The endpoints may be used for data communication between the host 100 and the microcontroller 101. For example, data received from the host 100 may be stored in an endpoint before being used at the microcontroller 101. The data to be transferred from the microcontroller 101 may be written in an endpoint before being read and transmitted.

For example, the device descriptor 240 may comprise one or more different configuration descriptors. The configuration descriptor may specify how the microcontroller is powered, the number of interfaces it has etc. The configuration descriptors may describe multiple configurations among which the host 100 may choose one. Each configuration can provide multiple interfaces, where each interface contains one or more endpoints which may be the channels for data and command exchange between the host 100 and the microcontroller 101. The host 100 may, for example, be configured to send a SetConfiguration (or set_configuration) command which indicates one of the configuration descriptors (e.g. the bootloader configuration). This is used to select the desired configuration.

The device descriptor 240 may be configured in accordance with the present disclosure. For example, the configuration descriptors of the device descriptor 240 may further comprise a bootloader configuration as described herein. And the host 100 may be configured to select the bootloader configuration via commands to the microcontroller 101. The host 100 may for example control the access to the microcontroller 101. In particular, requests to Endpoint 0 (the default control endpoint defined in the USB standard) of the endpoint register file 210 are checked and limited to predefined user requests. Other endpoints of the endpoint register file 210 may be organized in interfaces and may be handled by the respective applications or driver as long as the USB device is not in the bootloader configuration.

In a normal mode of operation of the microcontroller 101, the microcontroller may for example be executing the application code 222. The execution of the application 222 may for example be triggered or managed by user applications 105 of the host 100.

Figure 3:
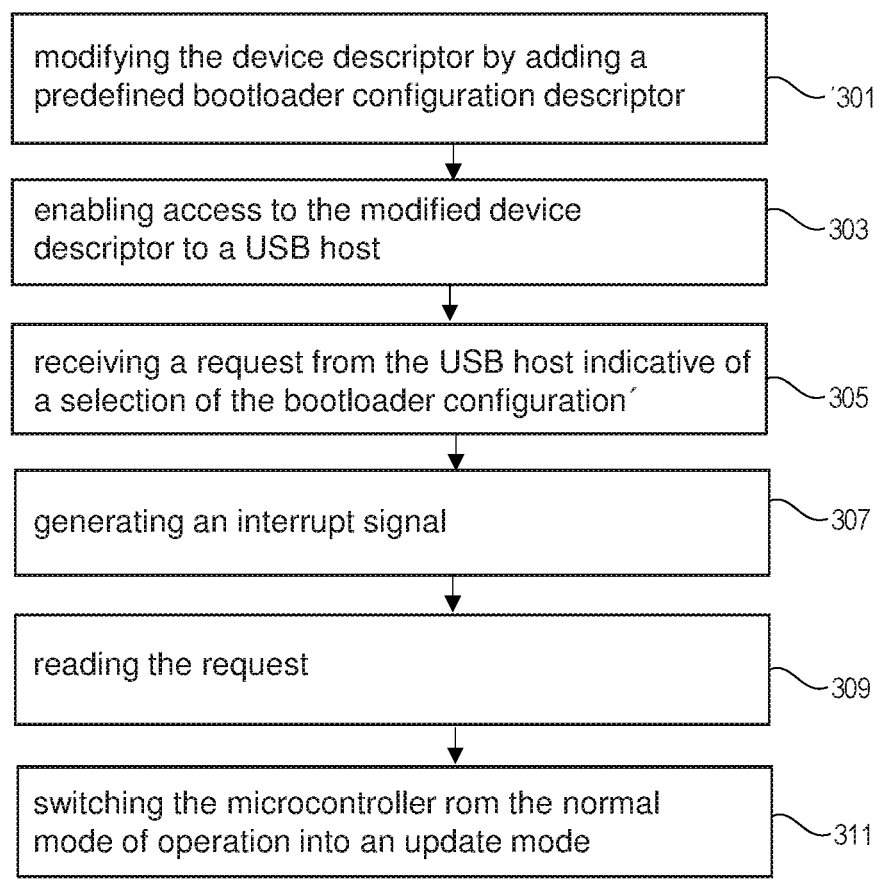
FIG. 3 is a flowchart of a method for updating firmware of a microcontroller in accordance with aspects of the invention.

FIG. 3 is a flowchart of a method for updating a firmware e.g. 224 of a USB device e.g. 101. The firmware update may for example be triggered by the host 100. The firmware update application 104 may receive or download a new update of the firmware 224 which may be the trigger event for the update of the firmware 224.

In step 301, the device descriptor 240 may be modified by adding a predefined bootloader configuration descriptor to the configurations descriptors of the device descriptor 240. The bootloader configuration descriptor describes a bootloader configuration that enables the update of the firmware 224 in accordance with the present disclosure. For example, the bootloader configuration indicates the endpoints of the microcontroller 101 that can store the requests involving the bootloader configuration and also for storing received updates from the host 100.

In step 303, the microcontroller 101 may enable access to the modified device descriptor 240 to a USB host e.g. host 100. For example, the microcontroller may provide the bootloader configuration descriptor to the host 100. The host 100 may be configured to generate one more or commands e.g. a SetConfiguration command, that request or indicate the selection of the bootloader configuration.

In step 305, a request may be received at the microcontroller 101 from the host 100. The request is indicative of a selection of the bootloader configuration. The request may for example be a SetConfiguration command.

Upon receiving that request, the microcontroller 101 is configured to generate in step 307 an interrupt signal. For example, upon reading the request the USB serial interface 206 may generate the interrupt signal (which may be referred to as an internal interrupt signal) within the CPU 202. In response to receiving the internal interrupt signal, the CPU 202 may read the request in step 309 e.g. from the RAM or from a CPU register. In response to reading the request, the CPU 202 may control the microcontroller 101 to switch in step 311 the microcontroller 101 from the normal mode of operation into an update mode of operation of the microcontroller 101 for updating the firmware 224. In the update operation mode the microcontroller 101 may operate in accordance with the bootloader configuration such that the CPU 202 may enter the bootloader code 220. The bootloader code 220 may be configured to read the updates received from the host 100 and update the firmware 224 during the update mode of operation.

The reading of the request by the CPU 202 may further comprise the use of the interrupt code 221 to check whether a control frame of the request is valid and to determine that the requested configuration is the predefined bootloader configuration.

If at the time of switching to the update operation mode, an application such as user application 105 is running on the host 100 and interacting with the microcontroller 101, this application 105 may be disconnected because the interfaces for the normal operation mode may become unavailable when the configuration is changed to the bootloader configuration.

For example, steps 305-311 may be repeated for each new update of the firmware that is to be implemented in the microcontroller 101.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for updating a firmware of a Universal Serial Bus (USB) device, the USB device being configured to execute one or more applications of the USB device in a normal mode of operation of the USB device, the USB device comprising a device descriptor indicative of one or more configuration descriptors, wherein a configuration descriptor is indicative of endpoints for data and command exchange, the computer-implemented method comprising:

a Universal Serial Bus (USB) interface implemented as a combination of both hardware and software, wherein the software of the USB interface is stored in the non-volatile memory, and wherein the hardware implementing the USB interface is designed so as to generate a non-maskable interrupt request to the processor core, ad wherein the software of the USB interface is configured to receive the interrupt from the processor core and to control the USB device to operate in accordance with a bootloader configuration of the one or more configuration descriptors;

storing, in the USB device, an interrupt code and a bootloader code, wherein the interrupt code is stored in a protected memory area of the USB device;

generating a modified device descriptor by modifying, using a processor circuit, the device descriptor by adding a predefined bootloader configuration descriptor to the configuration descriptors;

enabling, using the processor circuit, access to the modified device descriptor to a USB host, thereby causing the USB host to select the bootloader configuration;

receiving a request from the USB host indicative of a selection of the predefined bootloader configuration; and in response to receiving the request, locating the interrupt code and generating a non-maskable internal interrupt within the processor circuit;

checking, using the interrupt code, whether a control frame of the request is valid and whether a requested configuration within the request matches the predefined bootloader configuration; and in response to confirming that the request is valid and that the requested configuration matches the predefined bootloader configuration, entering the bootloader code thereby switching into an update mode of operation of the USB device for updating the firmware;

wherein a default control endpoint of the USB device is limited to predefined user requests and one or more other endpoints are organized in interfaces and handled by the one or more applications of the USB device so long as the USB device is not in the bootloader configuration.

2. The computer-implemented method of claim 1, wherein the request is indicative of one or more endpoints.

3. The computer-implemented method of claim 2, wherein the switching into the update mode comprises blocking access to the one or more endpoints by other applications than the bootloader code while the USB device is in the update mode.

4. The computer-implemented method of claim 1, wherein the bootloader code and the interrupt code are stored in a memory region of the USB device that can only be programmed by an external programmer and not by the processor.

5. The computer-implemented method of claim 1, wherein the request is received via a USB interface of the USB device.

6. The computer-implemented method of claim 5, wherein the interrupt is generated by the USB interface.

7. A computer program product comprising a computer-readable storage medium having computer-readable program code embodied therewith, the computer-readable program code configured to control a processor circuit to implement a method comprising:
  a Universal Serial Bus (USB) interface implemented as a combination of both hardware and software, wherein the software of the USB interface is stored in the non-volatile memory, and wherein the hardware implementing the USB interface is designed so as to generate a non-maskable interrupt request to the processor core, and wherein the software of the USB device to operate in accordance with a bootloader configuration of the one or more configuration descriptors
  storing, in a USB device, an interrupt code and a bootloader code, wherein the interrupt code is stored in a protected memory area of the USB device;
  generating a modified device descriptor by modifying, using a processor circuit, the device descriptor by adding a predefined bootloader configuration descriptor to the configuration descriptors;
  enabling, using the processor circuit, access to the modified device descriptor to a USB host, thereby causing the USB host to select the bootloader configuration;
  receiving a request from the USB host indicative of a selection of the predefined bootloader configuration; and
  in response to receiving the request locating the interrupt code and generating a non-maskable infernal interrupt within the processor circuit;
  checking, using the interrupt code, whether a control frame of the request is valid and whether a requested configuration within the request matches the predefined bootloader configuration; and
  in response to confirming that the request is valid and that the requested configuration matches the predefined bootloader configuration, entering the bootloader code, thereby switching into an update mode of operation of the USB device for updating the firmware;
  wherein a default control endpoint of the USB device is limited to predefined user requests and one or more other endpoints are organized in interfaces and handled by the one or more applications of the USB device so long as the USB device is not in the bootloader configuration.

8. The computer program product of claim 7, wherein the request is indicative of one or more endpoints.

9. The computer program product of claim 8, wherein switching into the update mode comprises blocking access to the one or more endpoints by other applications than the bootloader code while the USB device is in the update mode.

10. The computer program product of claim 7, wherein the bootloader code and/or the interrupt code are stored in a memory region of the USB device that can only be programmed by an external programmer and not by the processor.

11. The computer program product of claim 7, wherein the request is received via a USB interface of the USB device.

12. The computer program product of claim 11, wherein the interrupt is generated by the USB interface.

13. A microcontroller of a USB device, the microcontroller comprising:
  at least one processor core;
  a non-volatile programmable memory storing computerized instructions, said memory further comprising a protected region that can only be programmed by an external programmer and not by the processor core;
  a device descriptor indicative of one or more configuration descriptors; and
  a Universal Serial Bus (USB) interface implemented as a combination of both hardware and software, wherein the software of the USB interface is stored in the non-volatile memory, and wherein the hardware implementing the USB interface is designed so as to generate a non-maskable interrupt request to the processor core, and wherein the software of the USB interface is configured to receive the interrupt from the processor core and to control the USB device to operate in accordance with a bootloader configuration of the one or more configuration descriptors;
  wherein an interrupt code and a bootloader code are stored in the non-volatile programmable memory, and the interrupt code is stored in the protected region;
  wherein the USB interface is further configured to:
    receive a request from the USB host indicative of a selection of the bootloader configuration;
    in response to receiving the request, locate the interrupt code and generate the non-maskable interrupt request;
    check, using the interrupt code, whether a control frame of the request is valid and whether a requested configuration within the request matches the predefined bootloader configuration; and
    in response to confirming that the request is valid and that the requested configuration matches the predefined bootloader configuration, entering the bootloader code, thereby switching into an update mode of operation of the USB device for updating the firmware;
  wherein a default control endpoint of the USB device is limited to predefined user requests and one or more other endpoints are organized in interfaces and handled by one or more applications of the USB device so long as the USB device is not in the bootloader configuration.

14. The microcontroller of claim 13, wherein the USB interface is further configured to generate a modified device descriptor by modifying the device descriptor by adding the bootloader configuration descriptor to the one or more configuration descriptors.

15. The microcontroller of claim 14, wherein the USB interface is further configured to enable access to the modified device descriptor to a USB host, thereby causing the USB host to select the bootloader configuration.

* * * * *